United States Patent
Blanchet et al.

(10) Patent No.: US 6,974,644 B2
(45) Date of Patent: Dec. 13, 2005

(54) INTERNAL REFORMING FUEL CELL ASSEMBLY WITH SELECTIVELY ADJUSTABLE DIRECT AND INDIRECT INTERNAL REFORMING

(75) Inventors: Scott C. Blanchet, Monroe, CT (US); Ramakrishnan Venkataraman, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 10/774,113

(22) Filed: Feb. 6, 2004

(65) Prior Publication Data

US 2005/0175869 A1    Aug. 11, 2005

(51) Int. Cl.$^7$ ............................. H01M 8/04; H01M 8/06
(52) U.S. Cl. ............................. 429/17; 429/19; 429/20; 429/24; 429/26
(58) Field of Search ............................. 429/17, 19, 20, 429/24, 26

(56) References Cited

U.S. PATENT DOCUMENTS

| | | | |
|---|---|---|---|
| 4,182,795 A | 1/1980 | Baker et al. | |
| 4,365,007 A | 12/1982 | Maru et al. | |
| 4,567,117 A | 1/1986 | Patel et al. | |
| 4,647,516 A * | 3/1987 | Matsumura et al. | 429/19 |
| 4,788,110 A | 11/1988 | Bernard | |
| 4,877,693 A | 10/1989 | Baker | |
| 4,917,971 A * | 4/1990 | Farooque | 429/19 |
| 5,082,752 A * | 1/1992 | Koga et al. | 429/20 |
| 5,175,062 A | 12/1992 | Farooque et al. | |
| 5,348,814 A | 9/1994 | Niikura et al. | |
| 5,660,941 A | 8/1997 | Farooque et al. | |
| 6,458,477 B1 * | 10/2002 | Hsu | 429/17 |
| 2004/0071617 A1 | 4/2004 | Novacco et al. | |

* cited by examiner

*Primary Examiner*—Susy Tsang-Foster
(74) *Attorney, Agent, or Firm*—Cowan, Liebowitz & Latman, P.C.

(57) ABSTRACT

A fuel cell system in which a fuel cell assembly having one or more fuel cells is adapted to include one or more direct internal reforming passages and one or more indirect internal reforming passages for reforming a fuel supply. The system is further provided with a coupling assembly for selectively and adjustably controlling the coupling of first and second fuel supply portions to the respective one or more indirect internally reforming passages and the one or more direct internally reforming passages.

10 Claims, 7 Drawing Sheets

INTERNAL REFORMING FUEL CELL ASSEMBLY WITH SELECTIVELY ADJUSTABLE DIRECT AND INDIRECT INTERNAL REFORMING

BACKGROUND OF THE INVENTION

This invention relates to fuel cells and, in particular, to a high temperature fuel cell assembly which employs internal reforming of the supply fuel in such a way as to improve the temperature distribution within the fuel cell assembly.

It is customary in the use of fuel cells to arrange the cells in an assembly, usually a stack, to produce useful power levels. It is also customary to utilize a hydrogen containing fuel such as methane as the fuel supply for the fuel cell assembly and to reform this fuel to produce hydrogen containing fuel process gas for flow through the assembly.

In a high temperature internally reforming fuel cell assembly, such as, for example, an internally reforming molten carbonate fuel cell assembly, the fuel supply is reformed internally of the assembly to produce the fuel process gas. This gas is then conveyed through the anode compartments of the fuel cells of the assembly. As it passes through the anode compartments, the fuel process gas undergoes an electrochemical reaction with an oxidant process gas which is carried in the cathode compartments of the fuel cells of the assembly. The electrochemical reaction occurs via an electrolyte which separates the anode and cathode compartments and which conducts electrically charged ions therebetween. This results in the desired production of electrical energy or output from the assembly.

An internal reforming high temperature fuel cell assembly is advantageous in that it avoids the need for expensive and complex external reforming equipment. In addition, the reforming reaction, which is endothermic (i.e., absorbs or requires heat) can be used advantageously to help cool the assembly.

The reforming of the fuel supply in an internally reforming fuel cell assembly is realized by using a steam reforming catalyst. The catalyst is placed within the assembly in the path of the hydrocarbon fuel supply, to thereby reform the fuel supply and produce fuel process gas. Two forms of internal reforming have been used, direct and indirect. Each is based on the placement of the reforming catalyst in a particular relationship with respect to the anode compartments of the fuel cells of the assembly.

In direct internal reforming, the reforming catalyst is placed in anode passages of the fuel cell anode compartments which directly carry hydrocarbon fuel to the anode electrodes of the fuel cells, i.e., in anode passages which directly communicate with the anode electrodes. This has the advantage of directly providing the hydrogen-containing fuel gas resulting from the reforming process to such electrodes. However, in this type of arrangement, since the reforming catalyst is in the anode passages which directly carry hydrocarbon fuel, the catalyst is exposed via the anode electrodes and anode passages to the electrolyte of the assembly fuel cells. This exposure over time degrades the catalyst performance.

In indirect internal reforming, the reforming catalyst is placed in chambers or passages within the fuel cell assembly which are isolated or removed from the anode passages which directly communicate with the anode electrodes. The reformed process gas is then routed to these anode passages for electrochemical reaction. The advantage of indirect internal reforming is that since the reforming catalyst is situated in the isolated passages, the catalyst is better protected from poisoning or degradation by the fuel cell electrolyte.

U.S. Pat. No. 4,182,795 describes a system and method in which a high temperature fuel cell employs indirect internal reforming via passages isolated from the anode passages directly carrying the fuel supply gas to the anode electrodes. In this system and method, the flow in the isolated passages is set independently of that in the anode passages based on the overall quantity of cooling desired. Also, separate ducting for the two flow paths and external junctions and valves are used to deliver the reformed gas to the anode electrodes.

U.S. Pat. No. 4,365,007 discloses a fuel cell system and method employing direct internal reforming. In this case, the reforming catalyst is placed in a passage which communicates through a porous barrier with the anode passages directly carrying fuel supply gas to the fuel cell anodes. The porous barrier acts to partially isolate the catalyst from the electrolyte of the fuel cells, and the system further relies on a pressure difference between the catalyst containing passages and the anode passages to provide reformed gas to the anode electrodes and to prevent electrolyte vapor from reaching the catalyst. The costs of this system are high due to the need for a complex anode current collector to provide the isolated and anode passages as well as the extra material of the porous barrier. Also, the uniform delivery of reformed fuel gas to the anode passages through the porous barrier using a differential pressure may be difficult to realize.

U.S. Pat. No. 4,567,117 discloses a technique which can be used for a fuel cell using either indirect or direct internal reforming. In this case, the catalyst employed for reforming is tailored to promote uniform temperature distribution in the fuel cell. In particular, the catalyst is applied directly to those parts of an anode current collector which form either isolated passages or anode passages and is actively distributed so as to reform more gas in hotter areas of the fuel cell thereby reducing temperature non-uniformity. The limitations for direct internal reforming and indirect internal reforming discussed above for the '795 patent and the '007 patent apply here as well depending upon whether the technique of the patent is applied in a direct or an indirect internally reforming fuel cell.

U.S. Pat. No. 4,788,110 describes a technique usable in a direct internal reforming fuel cell in which the anode current collector forms catalyst containing passages which are partially shielded from the anode passages which are also formed by the current collector. With this configuration, the partial shielding of the catalyst makes it less able to participate in the reforming process and thereby reduces its effectiveness.

U.S. Pat. No. 5,175,062 describes an indirect internal reforming fuel cell stack with reforming units disposed at intervals along the stack length. The reforming units each contain a U-shaped catalyst containing chamber or passage having a fuel feed port at its corner. The reformed gas from the reforming units is passed to a manifold which feeds the anode passages communicating with the anode electrodes of the stack fuel cells for electrochemical reaction. In this system, due to the required size of the fuel feed tube, a relatively high fuel gas pressure drop is experienced and the cost of the system is increased.

U.S. Pat. No. 5,348,814 describes an indirect internal reforming fuel cell stack also with reforming units distributed along the stack length. In this stack, the manifolding is internal. Due to the complexity of the bipolar plate used in the stack to form each reforming unit, the cost of the stack is relatively high.

U.S. Pat. No. 5,660,941 discloses an indirect internal reforming fuel cell stack with various configurations for a catalyst member to be used in the isolated reforming chambers. A plate-like catalyst member and a mesh type member supporting catalyst pellets for insertion over peak regions of an anode current collector are described.

U.S. Pat. No. 4,877,693 describes a fuel cell stack employing both indirect and direct internal reforming. The indirect internally reforming is carried out by using catalyst-containing passages distributed along the fuel cell stack length. These passages are isolated from the anode passages directly carrying fuel supply gas to the fuel cell anode electrodes of the stack. The direct reforming is carried out via catalyst placed in the anode passages. In this case, the fresh supply gas is passed through the catalyst-containing passages and is partially reformed. The partially reformed gas is then passed through the anode passages where it is further reformed and where the reformed gas undergoes electrochemical reaction. A manifold is used to couple the partially reformed gas from the isolated catalyst-containing passages to the anode passages.

A more recent fuel cell stack that employs both indirect and direct internally reforming is disclosed in U.S. patent application Ser. No. 10/269,481, assigned to the same assignee hereof. In this stack, the catalyst-containing isolated passages are in the form of reforming units which are distributed along the length of the stack and which contain U-shaped flow paths. The outlets of the reforming units and the inlets of the anode compartments with the catalyst-containing anode passages communicate with a common manifold so that the partially reformed supply gas from the reforming units is passed to the anode passages. In this system also, the fuel supply feed is placed in the common manifold to mitigate against system leaks.

It is an object of the present invention to provide a fuel cell assembly having both direct and indirect internal reforming and which is better able to adapt to changes in the fuel cell assembly over the life of the assembly;

It is a further object of the present invention to provide a fuel cell assembly having both direct and indirect internal reforming and which is capable of better realizing desired temperature distribution and performance when fuel of different composition is used; and It is yet another object of the present invention to provide a fuel cell assembly having both direct and indirect internal reforming and which is capable of better realizing desired temperature distribution and performance in the face of catalyst degradation.

SUMMARY OF THE INVENTION

In accordance with the principles of the present invention, the above and other objectives are realized in a fuel cell system comprising a fuel cell assembly having one or more fuel cells and adapted to include one or more direct internal forming passages and one or more indirect internal reforming passages for reforming a fuel supply and a coupling assembly for selectively and adjustably controlling the coupling of first and second fuel supply portions to the respective one or more indirect internally reforming passages and the one or more direct internally reforming passages. In the embodiment of the invention to be disclosed hereinafter, the coupling assembly directs the first and second fuel supply portions to the indirect internal reforming passages and to a combining assembly, respectively. The latter combining assembly also receives the output from the indirect internal reforming passages. The combined output of the combining assembly is then fed to the direct internally reforming passages of the fuel cell assembly.

A conduit junction leads the first and second fuel supply portions to the first and second conduits, respectively, which feed the indirect reforming passages and the combining assembly. Valves in the first and second conduits allow selective adjustment of the first and second fuel supply portions.

BRIEF DESCRIPTION OF THE DRAWINGS

The above and other features and aspects of the present invention will become more apparent upon reading the following detailed description in conjunction with the accompanying drawings, in which.

DETAILED DESCRIPTION OF THE INVENTION

Figure 3:
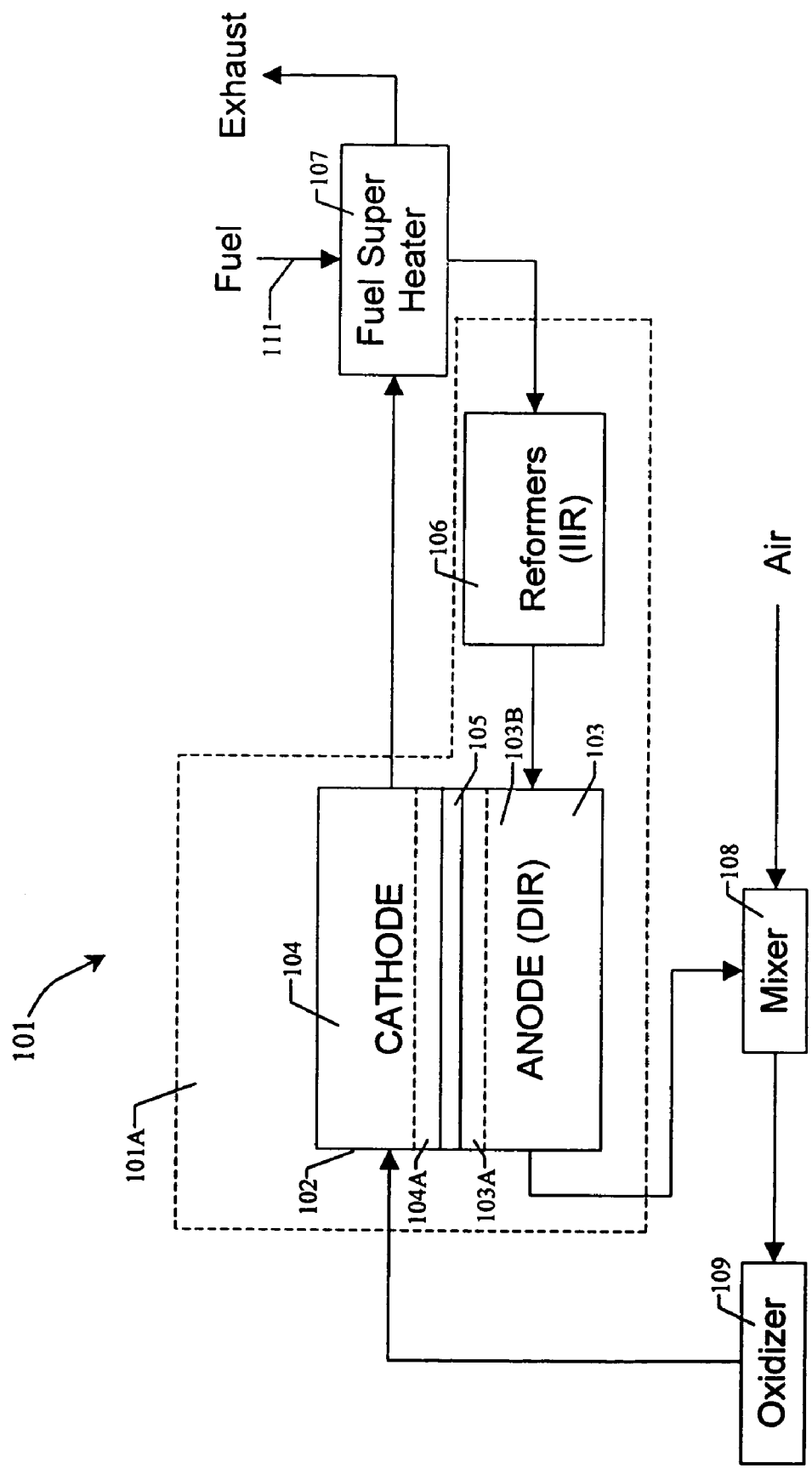
FIG. 3 illustrates a fuel cell system having direct and indirect internal reforming as in the '481 application.

FIG. 3 shows schematically a fuel cell system 101 of the type described in the '481 application the disclosure of which is incorporated herein by reference. In FIG. 3, the system 101 includes a fuel cell assembly 101A comprising one or more fuel cells 102 each having an anode compartment 103, a cathode compartment 104 and an electrolyte 105 situated therebetween. While only one fuel cell 102 is shown, the fuel cell assembly 101A, typically, has a large number of the cells 102 arranged on one another to form a fuel cell stack.

The anode compartment of the fuel cell 103 of the fuel cell 102 includes an anode electrode 103A and an anode passage 103B. The anode passage contains a reforming catalyst and is in direct communication with the anode electrode 103A. As a result, the anode passage causes both direct internal reforming of hydrocarbon containing fuel supply and applying reformed hydrogen containing fuel process gas directly to the anode electrode.

The fuel cell assembly 101A also includes a further passage 106 in the assembly 101A which is removed or isolated from the anode passage 103B and which also contains catalyst for indirect internal reforming of fresh hydrocarbon supply fuel. Again, while only one passage is shown, the assembly 101A will typically have a number of passages 106 distributed along the length of the fuel cell assembly and these passages are often formed by individual reforming units in thermal communication with the fuels cells of the assembly.

In the system of FIG. 3, fresh supply fuel 111 is passed through a super heater 107 which also receives the exhaust oxidant gas from the outlet of the cathode compartment 104 of the fuel cell 102. The fresh supply fuel is heated by passage through the superheater 107 and the heated fresh supply fuel is then passed into the indirect internal reforming passage 106 where a portion of the heated fresh supply fuel is reformed to produce hydrogen-containing fuel process gas. The mixture of remaining fresh supply fuel and hydrogen-containing fuel process gas is then coupled to the direct internal reforming anode passage 103B where a further portion of the remaining fresh supply fuel is converted to hydrogen-containing fuel process gas.

In passing through the anode passage, the hydrogen-containing fuel process gas undergoes electrochemical conversion with the oxidant process gas in the cathode compartment 104 of the fuel cell via the anode and cathode electrodes 103A and 104A and the electrolyte 105. This results in the desired production of an electrical output.

As is also shown, the anode exhaust gas from the anode passage, which contains unused hydrogen containing fuel process gas, is supplied to a mixing unit 108 which also receives fresh oxidant supply gas, shown as air. After being mixed in the mixer 108, the resultant mixed stream is supplied to the oxidizer 109 where the anode exhaust gas is burned to raise the temperature of the oxidant supply gas in the stream to that required by the fuel cell 102.

The system of FIG. 3, in using both indirect and direct internal reforming of the fresh supply fuel, is thus able to reduce the effects of catalyst degradation due to less exposure of the catalyst to electrolyte. It is also better able to realize desired temperature distribution within the fuel cell for operation at desired temperatures. However, while these results can be achieved for a given composition of fresh supply fuel, a change in the composition will degrade performance. Also, as catalyst degradation occurs over the life of operation of the cell and stack, performance again will suffer.

Figure 1:
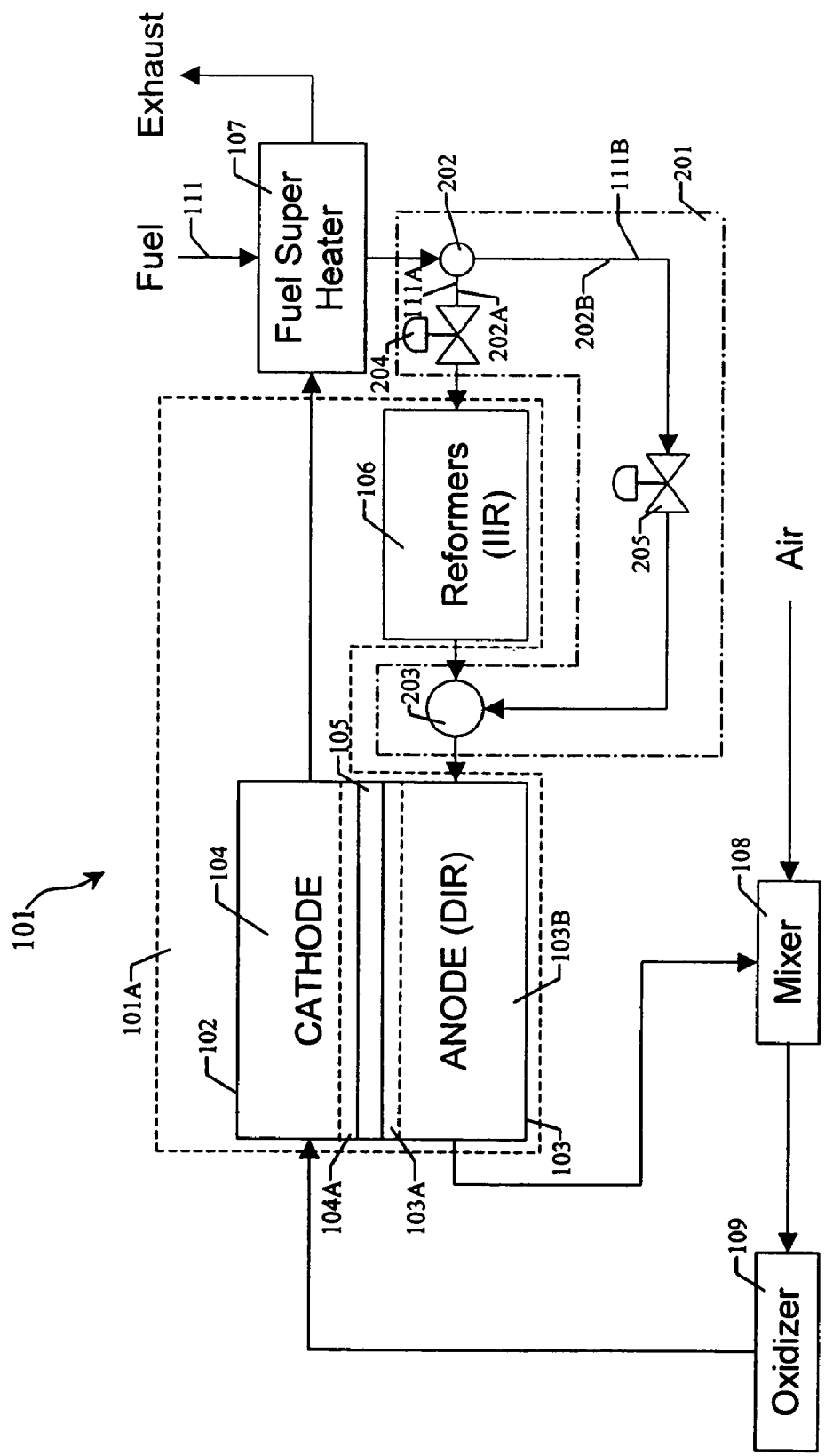
FIG. 1 illustrates a fuel cell system having direct and indirect internal reforming in accordance with a first embodiment of the present invention.

Accordingly, to be better able to adapt the fuel cell system 101 to fresh supply fuel of different compositions and to catalyst degradation, the system of FIG. 3 has been modified in accordance with the principles of the invention so as to afford a greater measure of control over the supply of fuel to the indirect internal reforming passage 106 and the direct internal reforming anode passage 103B. FIG. 1 shows a first embodiment of the invention with this added measure of control.

In FIG. 1, like components as those in FIG. 3 have been labeled similarly. In particular, in accordance with the invention, in FIG. 1, the system of FIG. 3 has been modified to include a coupling assembly 201 for adjustably and selectively controlling the flow of first and second portions 111A and 111B of the fresh fuel supply 111 to the indirect internal reforming passage 106 and the direct internal reforming anode passage 103B. More particularly, the assembly 201 includes a conduit junction 202 at which the first and second portions 111A and 111B of the fresh supply fuel 111 are segmented or divided and made available to first and second conduits or lines 202A and 202B, respectively. The first conduit 202A leads to the indirect internal reforming passage 106 and the second conduit leads to a combiner 203 which is also part of the coupling assembly 201.

The combiner 203 combines the partially reformed gas and the remaining fresh supply fuel gas leaving the indirect internal reforming passage 106 with the second portion 111B of the fresh supply fuel carried by the conduit 202B. This combined stream is then fed into the direct internal reforming anode passage 103B for further reforming and electrochemical reaction. The assembly 201 includes further valves 204 and 205 in the conduits 202A and 202B, respectively, for permitting adjustment of the first and second portions 111A and 111B of the fresh supply fuel.

As can be appreciated, the valves 204 and 205 permit independent adjustment of the respective fresh fuel supply portions, which allows for better accommodation for desired temperature distribution in the assembly 101A for different fresh supply fuel compositions. Thus, by controlling the valve 205, for example, a more optimum temperature distribution in the assembly 101A can be realized. More particularly, if the composition of fresh fuel supply 111 is such that it would be reformed to an excessive degree in the indirect internal reforming passage 106, by opening the valve 205 more, the fresh fuel supply portion 111B can be increased, thereby decreasing the fresh fuel supply portion 111A so that the appropriate amount of fuel supply would be reformed in the indirect passage 106. Also, as the operating time of the fuel cell assembly 101A increases and the catalyst in the direct internal reforming passages 103B degrades, the valve 204 can be opened more so that more fresh supply fuel is reformed in the indirect internal reforming passages 106 to account for the degrading of the catalyst in the passages 103B.

As can be appreciated, in the FIG. 1 embodiment of the invention, the coupling assembly 201 is responsive to the fresh fuel supply after it passes through the superheater 107. In an alternate embodiment of the invention, shown in FIG. 2, the coupling assembly 201 is situated preceding the superheater 107.

Figure 2:
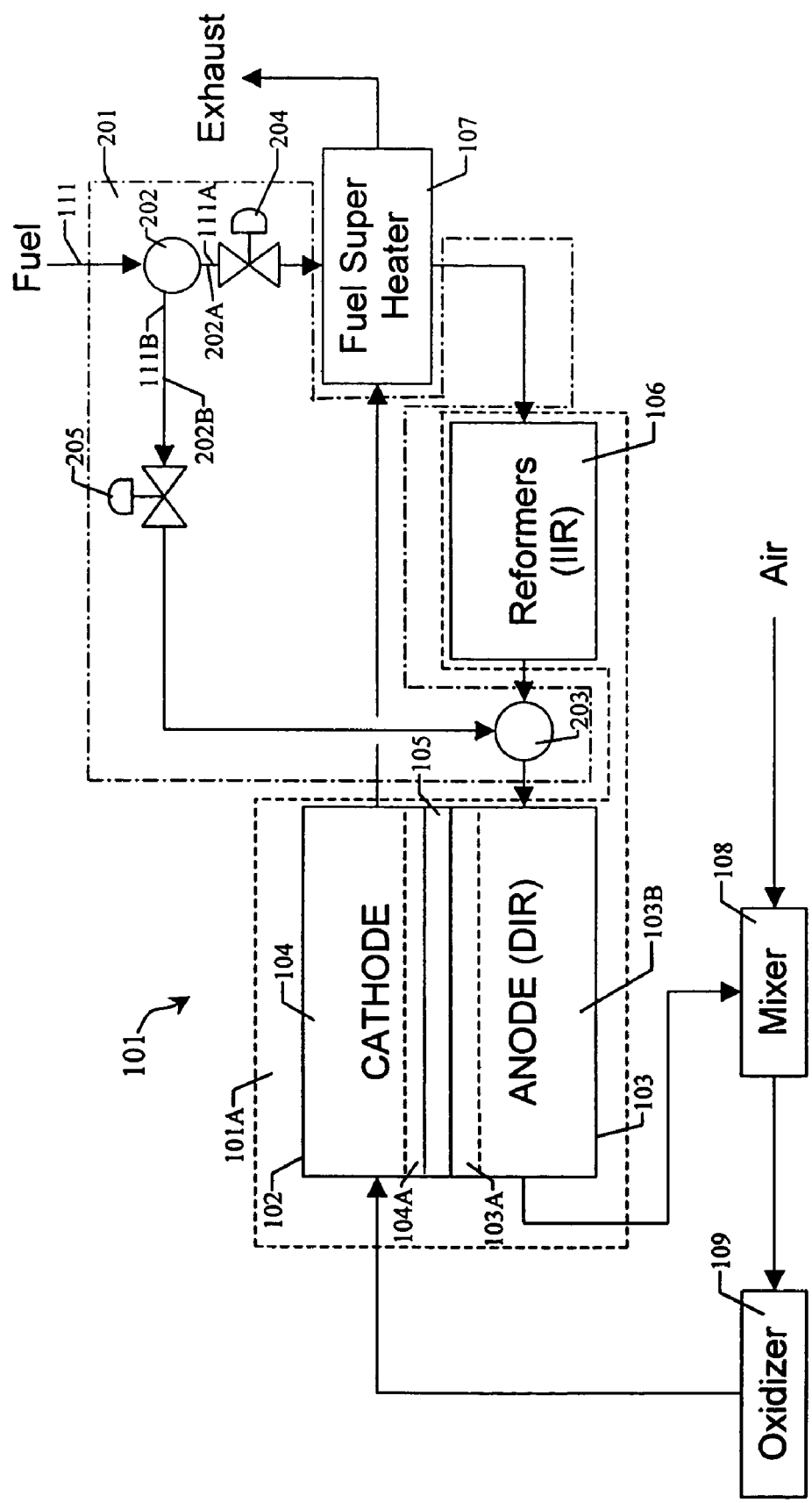
FIG. 2 illustrates a fuel cell system having direct and indirect internal reforming in accordance with a second embodiment of the present invention.

As shown in FIG. 2, the conduit junction 202 receives the fresh supply fuel 111 before it enters the superheater 107 and makes the first and second portions 111A and 111B of the fresh supply fuel 111 available to the first and second conduits or lines 202A and 202B, respectively. In this case, the first conduit 202A leads to the superheater 107 and from the superheater 107 to the indirect internal reforming passages 106. The second conduit 202B again leads to the combiner 203 without passage through the superheater.

With this embodiment, the first second portion of fresh supply fuel 111B is thus at a cooler temperature than the fuel cell assembly temperature when it is combined with the stream from the indirect internal reforming passage 106. This permits additional cooling of the assembly.

Figure 4:
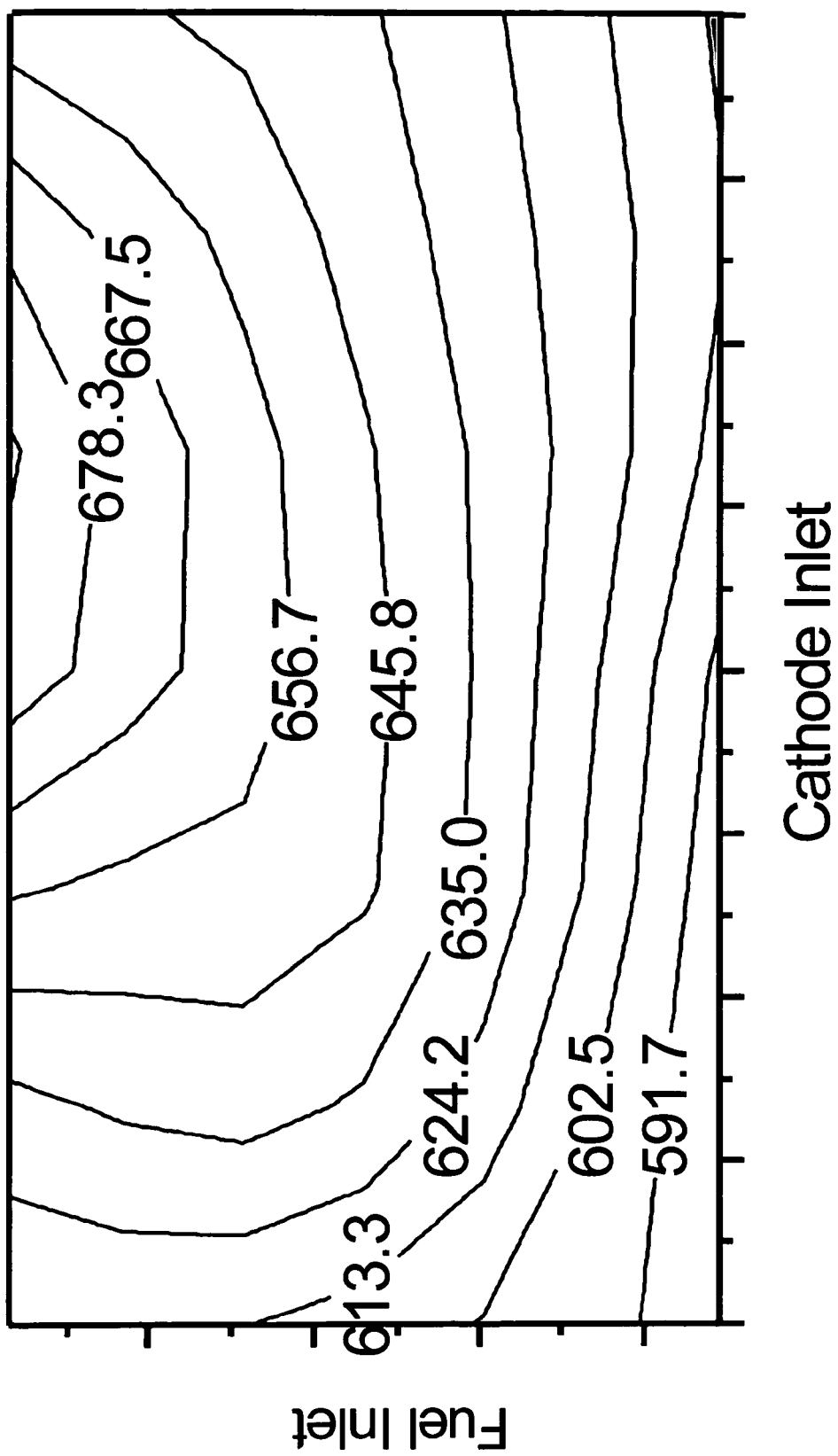
FIG. 4 shows experimentally measured stack temperatures for the fuel cell system of the invention shown in FIG. 1.
Figure 5:
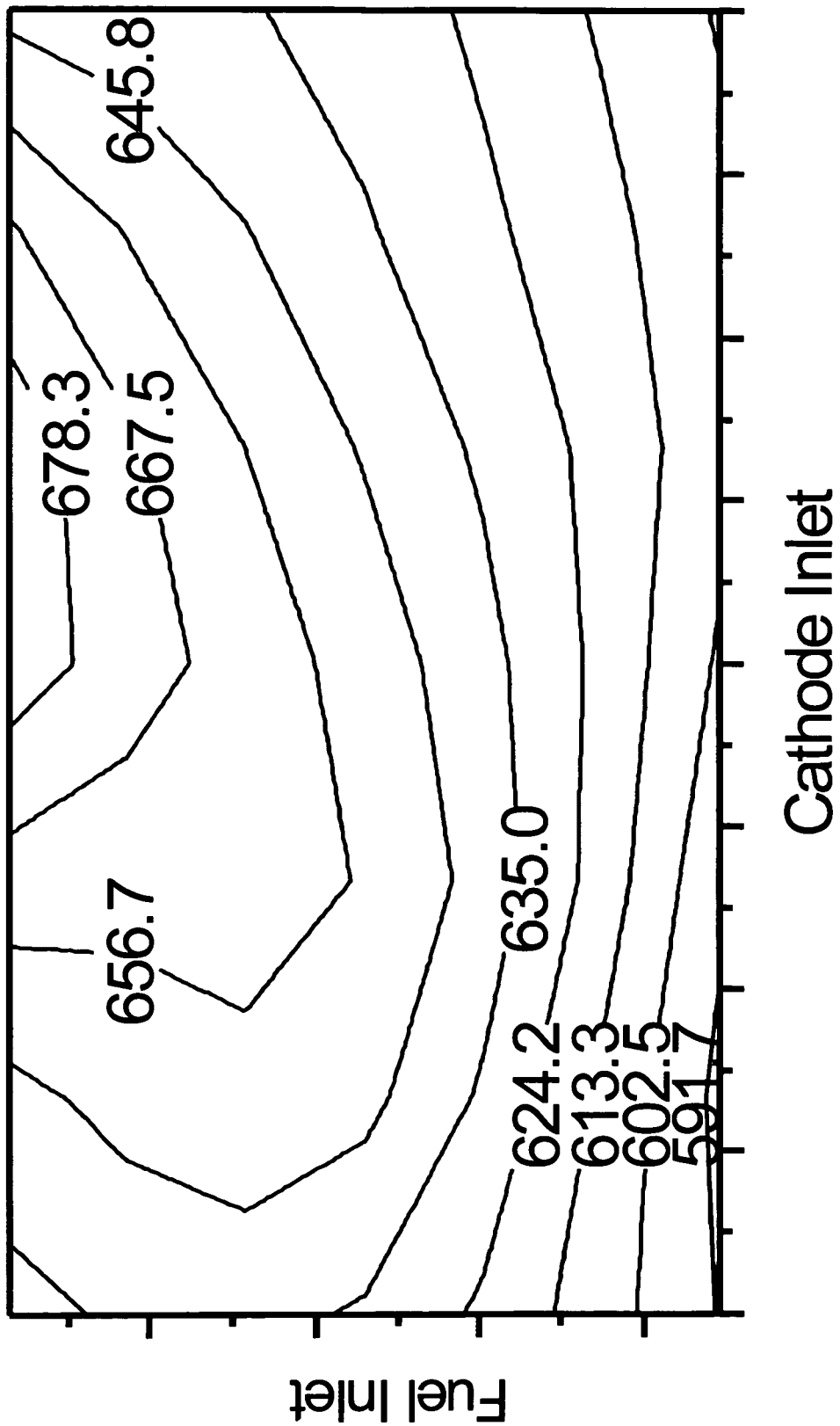
FIG. 5 shows experimentally measured stack temperatures for the fuel cell system of the '481 application shown in FIG. 3.

Experimentally measured temperatures of the fuel cell assembly of the invention of FIG. 1 and a fuel cell assembly of the '481 application at equivalent operating points are shown in FIGS. 4 and 5, respectively. The measurements in FIG. 5 for the '481 application assembly show temperatures near the fuel inlet face approaching 650° C. With the assembly of the invention, fuel inlet face temperatures are reduced to below 620° C. as shown in FIG. 4.

Figure 6:
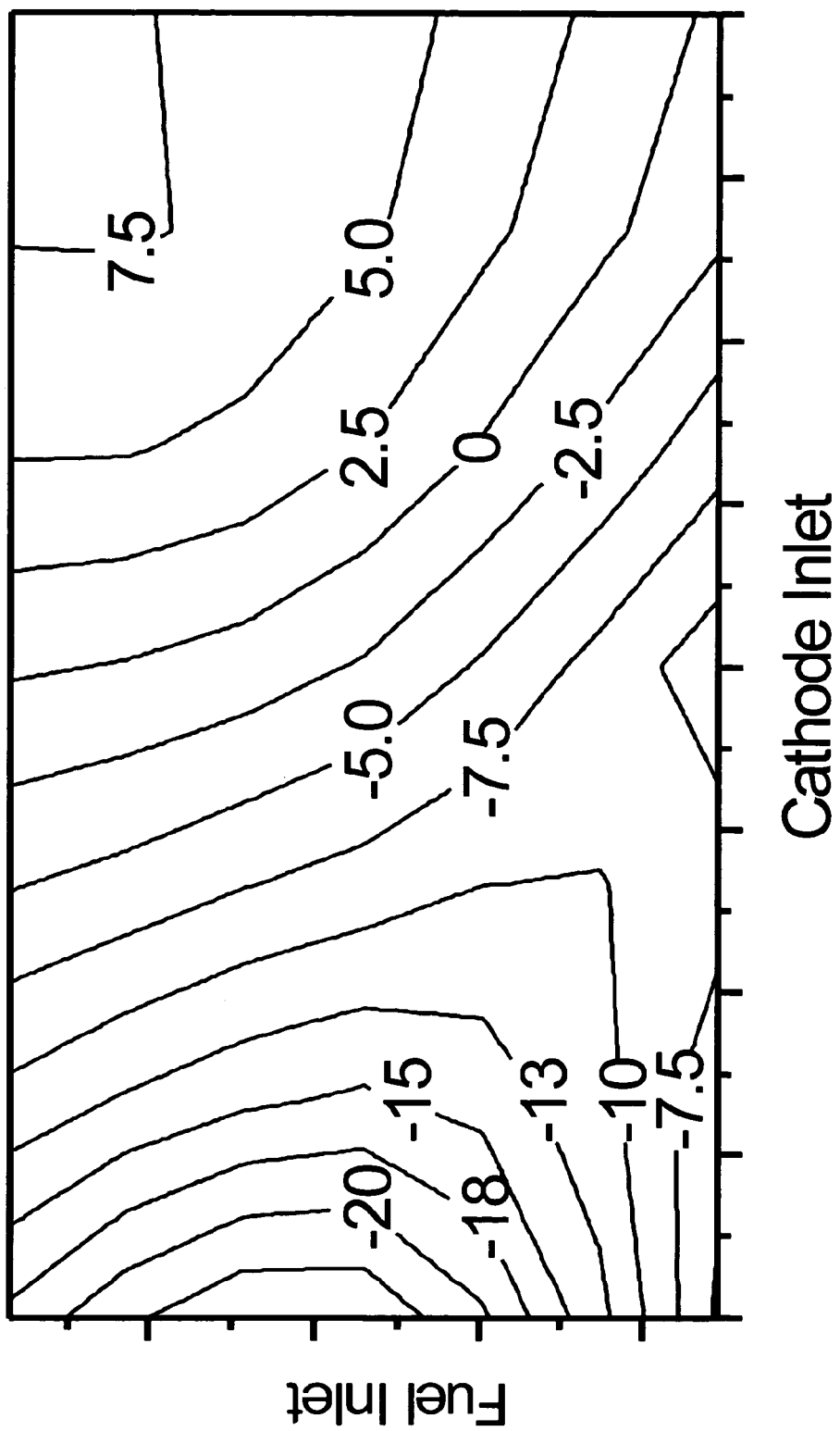
FIG. 6 shows the measured improvement in stack temperature distribution of the fuel cell system of the invention of FIG. 1 as compared to the fuel cell system of the '481 application shown in FIG. 3.

The improvement in temperature distribution of the assembly of the invention of FIG. 1 as compared to the assembly in the '481 application is shown in FIG. 6. Here, the net cooling of the fuel inlet area of the assembly of the invention can be clearly seen. These experiments simulate the expected improvement in temperature distribution by employing the assembly of the invention with an alternate fuel in a given assembly design.

Figure 7:
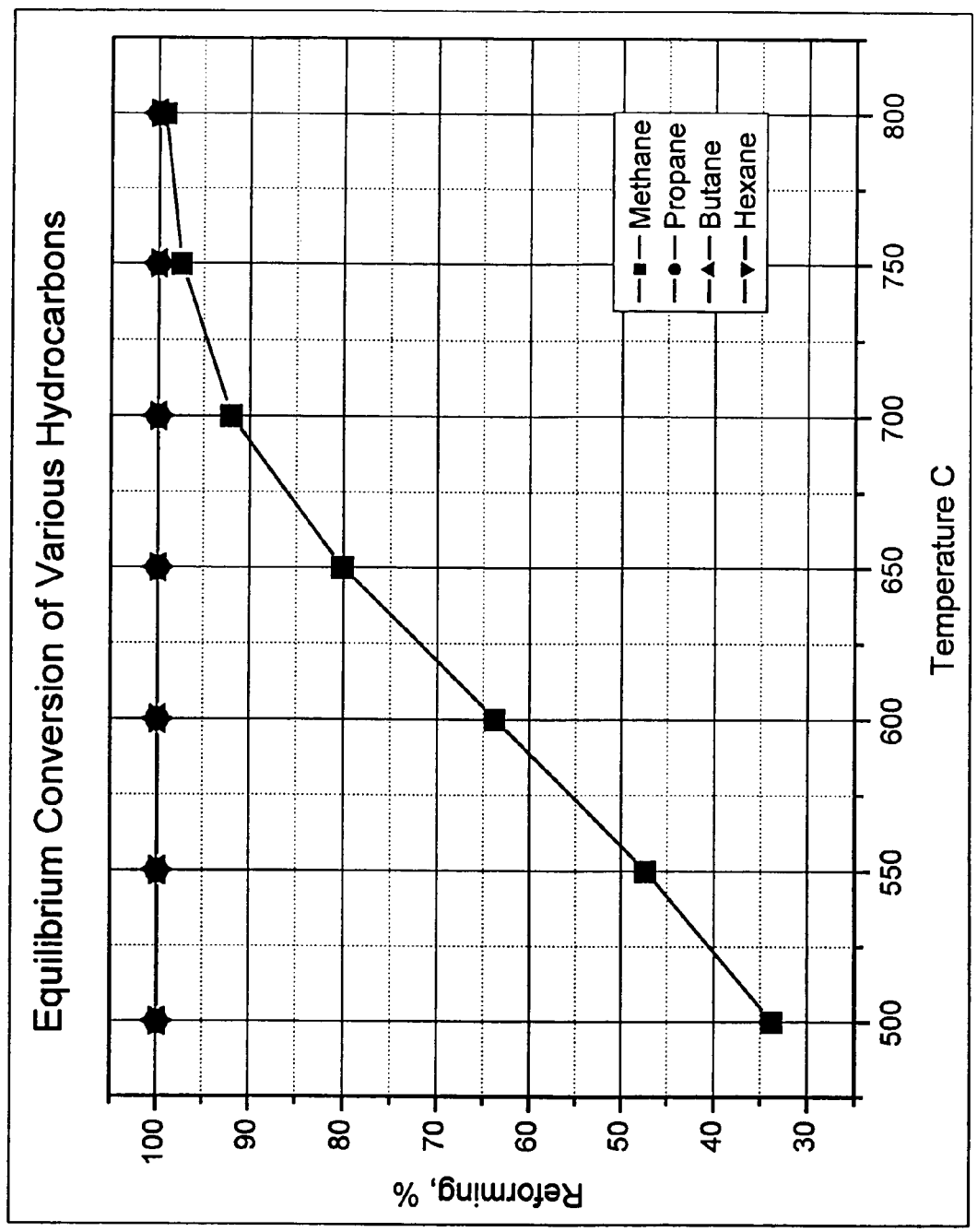
FIG. 7 shows the calculated reforming efficiency for various fuels as a function of temperature.

Calculated equilibrium reforming efficiency for a variety of fuels as a function of temperature is shown in FIG. 7. Typically, fuel cell systems are designed for optimum temperature distribution with an indirect internal reforming efficiency of between 40 and 80%. As can be seen from FIG. 7, this makes methane an ideal fuel at 550–650° C., the operating temperature of the fuel cell assembly. For other fuels, such as propane, butane and hexane, the indirect internal reforming for an assembly designed for methane would be near 100%. This would, in turn, cause the fuel inlet face of the assembly to run too hot and cause a high temperature gradient in the assembly. With the assembly of the invention of FIG. 1, the effective indirect internal reforming can be continuously adjusted from 100% with the valve 205 closed to 40% or less with the appropriately selected positions for the opened valves 204 and 205. This offers a significant advantage where operation on multiple fuels is desired such as for security applications.

In all cases it is understood that the above-described arrangements and methods are merely illustrative of the many possible specific embodiments which represent applications of the present invention. Numerous and varied other arrangements can be readily devised in accordance with the principles of the present invention without departing from the spirit and the scope of the invention.

What is claimed is:

1. A fuel cell system comprising:
   a fuel cell assembly having one or more fuel cells and further including one or more direct internal reforming passages and one or more indirect internal reforming passages for reforming a fuel supply; and
   a coupling assembly for coupling a first fuel supply portion to the one or more indirect internally reforming passages and a second fuel supply portion to the one or more direct internally reforming passages, said coupling assembly enabling selective and adjustable controlling of said first fuel supply portion and selective and adjustable controlling of said second fuel supply portion.

2. A fuel cell system in accordance with claim 1, wherein:
   said fuel cell system further comprises a heater for heating supply fuel; and
   said coupling assembly receives said heated supply fuel from said heater and segments said heated supply fuel into said first and second fuel supply portions.

3. A fuel cell system in accordance with claim 1, wherein said fuel cell system further comprises a heater; and
   said coupling assembly receives a supply fuel, segments said supply fuel into said first and second fuel supply portions and carries said first fuel supply portion through said heater prior to said first fuel supply portion being coupled to said one or more indirect internal reforming passages.

4. A fuel cell system in accordance with claim 1, wherein:
   said coupling assembly combines said second fuel supply portion with the stream from said one or more indirect internal reforming passages to form a combined stream and couples the combined stream to the one or more direct internal reforming passages.

5. A fuel cell system in accordance with claim 4, wherein:
   said coupling assembly comprises: a junction point which receives fuel supply and segments said fuel supply into said first and second fuel supply portions; a combiner; a first conduit for carrying said first fuel supply portion to said one or more indirect internal reforming passages; a second conduit for carrying said second fuel supply portion to said combiner; the stream from said one or more indirect internal reforming passages being coupled to said combiner; and the combined stream of said combiner being coupled to said one or more direct internal reforming passages.

6. A fuel cell system in accordance with claim 5, wherein:
   said coupling assembly further comprises: a first valve in said first conduit for adjusting the first fuel supply portion; and a second valve in said second conduit for adjusting the second filet supply portion.

7. A fuel cell system in accordance with claim 6, wherein:
   said fuel cell system further comprises a heater which precedes said junction point and heats said fuel supply prior to said fuel supply being received in said junction point.

8. A fuel cell system in accordance with claim 7, wherein:
   said heater heats said fuel supply with cathode exhaust gas from said one or more fuel cells; and
   said fuel cell system further comprises: a mixer for mixing anode exhaust gas from said one or more fuel cells with an oxidant supply; an oxidizer for receiving the stream from said mixer, said oxidizer output serving as the cathode inlet gas for said one or more fuel cells.

9. A fuel cell system in accordance with claim 6, wherein:
   said fuel cell system further comprises a heater which follows said junction point and heats said first fuel supply portion before said first fuel supply portion is carried to said one or more indirect internal reforming passages.

10. A fuel cell system in accordance with claim 9, wherein:
    said heater heats said fuel supply with cathode exhaust gas from said one or more fuel cells; and
    said fuel cell system further comprises: a mixer for mixing anode exhaust gas from said one or more fuel cells with an oxidant supply; an oxidizer for receiving the stream from said mixer, said oxidizer output serving as the cathode inlet gas for said one or more fuel cells.

\* \* \* \* \*

UNITED STATES PATENT AND TRADEMARK OFFICE
CERTIFICATE OF CORRECTION

| | | |
|---|---|---|
| PATENT NO. | : 6,974,644 B2 | Page 1 of 1 |
| APPLICATION NO. | : 10/774113 | |
| DATED | : December 13, 2005 | |
| INVENTOR(S) | : Scott C. Blanchet et al. | |

It is certified that error appears in the above-identified patent and that said Letters Patent is hereby corrected as shown below:

Column 6, line 41 delete "the first second portion" and insert --the second portion - -

Column 8, line 20 delete "second filet" and insert --second fuel--

Signed and Sealed this

First Day of August, 2006

JON W. DUDAS
*Director of the United States Patent and Trademark Office*